US008762597B2

(12) United States Patent  
Guo (10) Patent No.: US 8,762,597 B2  
(45) Date of Patent: Jun. 24, 2014

(54) METHOD AND APPARATUS FOR SWITCHING THE MAIN/STANDBY SINGLE BOARD

(75) Inventor: Xiangdong Guo, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 315 days.

(21) Appl. No.: 13/258,442

(22) PCT Filed: Sep. 14, 2009

(86) PCT No.: PCT/CN2009/073918  
§ 371 (c)(1),  
(2), (4) Date: Nov. 10, 2011

(87) PCT Pub. No.: WO2010/135882  
PCT Pub. Date: Dec. 2, 2010

(65) Prior Publication Data  
US 2012/0056489 A1 Mar. 8, 2012

(51) Int. Cl.  
*G06F 3/00* (2006.01)

(52) U.S. Cl.  
USPC .............................................. 710/33

(58) Field of Classification Search  
None  
See application file for complete search history.

(56) References Cited

U.S. PATENT DOCUMENTS

| 6,091,731 A * | 7/2000 | Biegaj et al. ............... 370/235.1 |
| 7,808,982 B2 * | 10/2010 | Reilly ........................... 370/357 |
| 2007/0140155 A1 * | 6/2007 | Yu ................................ 370/312 |

* cited by examiner

*Primary Examiner* — Henry Tsai  
*Assistant Examiner* — Juanito Borromeo  
(74) *Attorney, Agent, or Firm* — Ling Wu; Stephen Yang; Ling and Yang Intellectual Property LLC (57) ABSTRACT

The present invention discloses a method and apparatus for switching an active board and a standby board, and the active board and the standby board respectively are one of the first working state board and the second working state board. The method disclosed in present invention includes: switching a first type function module on said first working state board into a second working state; switching the first type function module on said second working state board into said first working state; switching a second type function module on said second working state board into said first working state; and switching the second type function module on said first working state board into said second working state.

11 Claims, 5 Drawing Sheets

FIG. 5

METHOD AND APPARATUS FOR SWITCHING THE MAIN/STANDBY SINGLE BOARD

TECHNICAL FIELD

The present invention belongs to the communication technique field, and particularly, relates to a method and apparatus for switching an active board and a standby board.

BACKGROUND OF THE RELATED ART

The telecommunication network is required that the communication device is able to provide high reliable and uninterrupted service, and thus methods of redundancy backup and load sharing are generally used to enhance reliability of devices in a communication system. Redundancy backup refers to use a plurality of devices with the same function to carry out the switchover working, and particularly in the case of the active device being faulted or maintenance update being required, the standby device replaces the active device to continue the working, thereby ensuring the uninterrupted operation of the communication system. The load sharing is also based on the similar principle, and utilizes switchover working or co-operations of a plurality of devices to improve the system reliability.

The component using the redundancy backup should provide the active and standby switching mechanism so as to implement the requirement of the reliability and maintainability. The normal redundancy backup and active and standby switching techniques include following modes: 1+1, 1:1, and 1:N and so on, wherein the 1+1 backup refers that the active and standby units work at the same time, and the active unit is responsible for the normal working, and the standby unit should keep the consistency between various function modules and the active unit; when the abnormal case occurs and the switching is triggered, the standby unit replaces all the workings of the original active unit. For the 1:1 and 1:N backup, the standby unit only starts to work after a fault of the active unit occurs.

Generally, one complex telecommunication device comprises a plurality of processing units, and these units should work cooperatively, and therefore, various units should communicate with each other, and the connection relationships between each other are more complicated and various. And the board using the active and standby protection generally has more connection relationships with other boards, and its status is very important. Therefore, the protection switching mechanism certainly should have very high reliability so as to minimize the damage to the services in the switching process. The switching is usually divided into different varieties such as the manual switching, automatic switching, and compulsory switching and so on according to different causes of triggering the switching. The present invention does not pay attention to the causes of the switching.

Figure 1:
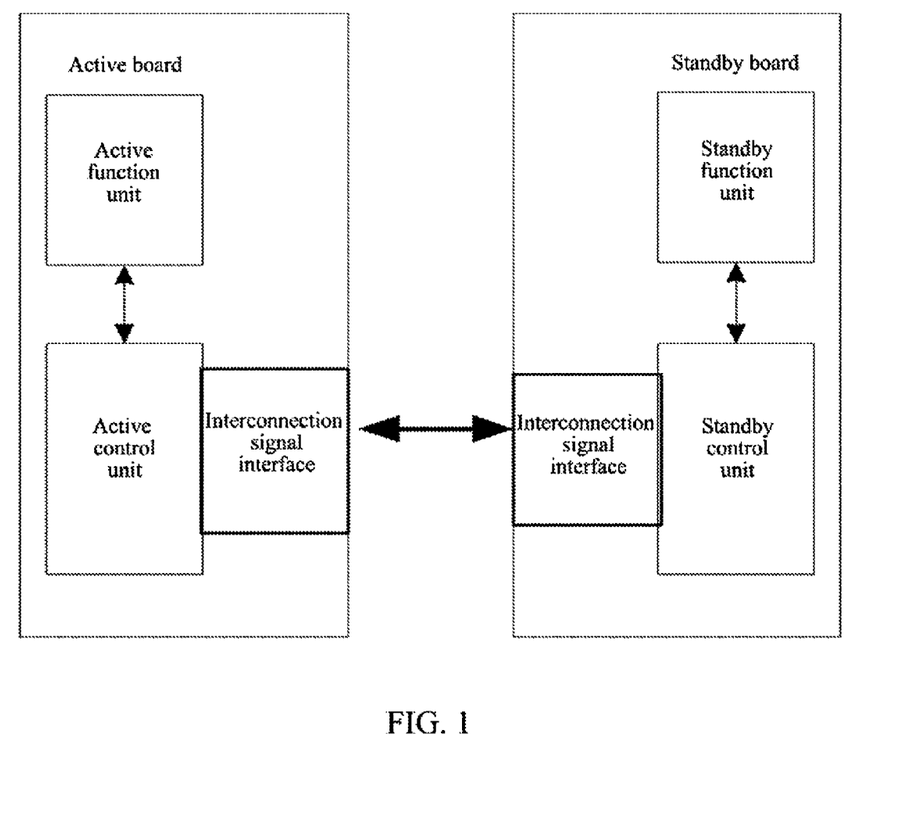
FIG. 1 is a structure diagram of the system for switching the active and standby in the related art.

At present, there are many protection switching methods for the active and standby function units with the single function, and FIG. 1 shows a typical structure of the system for switching the active and standby boards, and the system comprises: an active board and a standby board, wherein the active board comprises: an active function unit, an active control unit and an interconnection signal interface, and the standby board comprises: a standby function unit, a standby control unit and an interconnection signal interface. However, the complexity of the current telecommunication devices becomes higher and higher, and sometimes, the system designer will integrate a plurality of function units separated from each other into one board based on a certain concern. Then the requirement of the active and standby switching of this board will be higher than the active and standby switching which only has the single active function unit and single standby function unit.

For a system for switching the active and standby boards comprising multiple function units, if requirements of these function units for the active and standby states are the same, for example all of them are required to avoid being in the active state at the same time, but can be in the standby state at the same time in a short term, then the problem is not serious, and it can be required that all the function units of the active board are switched to the standby state at first, and then the standby board is notified to switch all the units into the active state. However, if requirements of these function units for the active and standby states are different in the switching process, the case is completely different. For example, the function units A on the active and standby boards are required to be unable to have the time of being in the active state occurring at the same time, otherwise the service interruption will be caused; however, the function units A on the active and standby boards are able to be in the standby state in a short term at the same time. For example the Ethernet function units, if the active state occurs at the same time, a serious consequence of forming a ring is caused. At present, a majority of function units belong to this case. However, the function units B are required to be unable to have the time of being in the standby state occurring at the same time, otherwise the service damage will also be caused; however the function units B are able to be in the active state in a short term at the same time; for example for the active and standby clock units, the standby clock unit wants to extract the clock of the active clock unit, thereby synchronizing to the active clock unit; if both are in the standby state, then both will extract the clock from the other, which will cause a serious consequence of the clock losing lock. If the requirement of the system design is to integrate the function units A and B into one board and the system is also required to be able to securely implement the active and standby switching, and the traditional switching way attends to one thing and loses the sight of another, and is obviously unable to satisfy the requirement. For the more complex system, for example the system comprises a plurality of function units which are required to avoid being in the active state at the same time and a plurality of function units which are required to avoid being in the standby state at the same time, the prior art is unable to implement the active and standby switching.

SUMMARY OF THE INVENTION

In order to solve the problem of being unable to implement the active and standby switching in the system comprising a plurality of function units which are required to avoid being in the active state at the same time and a plurality of function units which are required to avoid being in the standby state at the same time, the present invention provides a method and apparatus for switching an active board and a standby board.

The present invention provides a method for switching an active board and a standby board, and said active board is one of a first working state board and a second working state board, said standby board is the other of the first working state board and the second working state board; and said method comprises:

switching a first type function module on said first working state board into a second working state, wherein said first type function module is unable to be in a first working state on said first working state board and said second working state board at the same time;

switching the first type function module on said second working state board into said first working state;

switching a second type function module on said second working state board into said first working state, wherein said second type function module is unable to be in said second working state on said first working state board and said second working state board at the same time; and switching the second type function module on said first working state board into said second working state.

Furthermore, before the step of switching the first type function module on said first working state board into the second working state, the method further comprises: determining that said first working state board is able to be switched and sending a first switching notification.

Furthermore, the step of switching the first type function module on said first working state board into said second working state comprises: switching said first type function module on said first working state board into said second working state according to said first switching notification;

the step of switching said first type function module on said second working state board into the first working state comprises: switching said first type function module on said second working state board into said first working state according to said first switching notification.

Furthermore, before the step of switching the second type function module on said second working state board into said first working state, the method further comprises:

determining that said second working state board is able to be switched and sending a second switching notification.

Furthermore, the step of switching the second type function module on said second working state board into said first working state comprises: switching said second type function module on said second working state board into said first working state according to said second switching notification;

the step of switching the second type function module on said first working state board into said second working state comprises: switching said second type function module on said first working state board into said second working state according to said second switching notification.

Furthermore, the method further comprises: carrying out switching shielding to forbid responding to a new switching request after determining that said first working state board is able to be switched.

Furthermore, after the step of switching the first type function module on said first working state board into the second working state, and switching the first type function module on said second working state board into said first working state, the method further comprises:

switching a third type function module on said first working state board into said second working state, and switching the third type function module on said second working state board into said first working state, wherein said third type function module is in said first working state or said second working state on said first working state board and said second working state board at the same time, or said third type function module is in said first working state on said first working state board and is in said second working state on said second working state board, or said third type function module is in said second working state on said first working state board and is in said first working state on said second working state board;

after the step of switching the second type function module on said second working state board into the first working state, and switching the second type function module on said first working state board into said second working state, further comprises:

switching said third type function module on said second working state board into said first working state, and switching said third type function module on said first working state board into said second working state.

Furthermore, the method further comprises: relieving said switching shielding after completing all switchings.

At the same time, the present invention further provides an apparatus for switching an active board and a standby board, and said active board is one of a first working state board and a second working state board, and said standby board is the other of the first working state board and the second working state board; and said apparatus comprises:

a first switching execution module, which is configured to switch a first type function module on said first working state board into a second working state, wherein said first type function module is unable to be in a first working state on said first type function board and said second working state board at the same time, and switch the first type function module on said second working state board into said first working state; and a second switching execution module, which is configured to switch a second type function module on said second working state board into said first working state, wherein said second type function module is unable to be in said second working state on said first working state board and said second working state board at the same time, and switch the second type function module on said first working state board into said second working state.

Furthermore, said apparatus further comprises:

a control module, which is configured to determine that said first working state board is able to be switched and send a first switching notification, and determine that said second working state board is able to be switched and send a second switching notification.

Furthermore said first switching execution module is further configured to switch said first type function module on said first working state board into said second working state according to said first switching notification, and switch said first type function module on said second working state board into said first working state according to said first switching notification;

said second switching execution module is further configured to switch said second type function module on said second working state board into said first working state according to said second switching notification, and switch said second type function module on said first working state board into said second working state according to said second switching notification.

Furthermore, said control module is further configured to carry out switching shielding to forbid responding to a new switching request after determining that said first working state board is able to be switched; and is further configured to relieve said switching shielding after completing all switchings.

Furthermore, said first switching execution module is further configured to switch a third type function module on said first working state board into said second working state, and switch the third type function module on said second working state board into said first working state, wherein said third type function module is in said first working state or said second working state on said first working state board and said second working state board at the same time, or said third type function module is in said first working state on said first working state board and is in said second working state on said second working state board, or said third type function module is in said second working state on said first working state board and is in said first working state on said second working state board;

said second switching execution module is further configured to switch said third type function module on said second working state board into said first working state, and switch said third type function module on said first working state board into said second working state.

The method and apparatus for switching an active board and a standby board provided in the present invention switch function modules in sequence according to different type function modules and enable to implement the active and standby switching in the system comprising a plurality of function units which are required to avoid being in the active state at the same time and a plurality of function units which are required to avoid being in the standby state at the same time.

PREFERRED EMBODIMENTS OF THE PRESENT INVENTION

Figure 2:
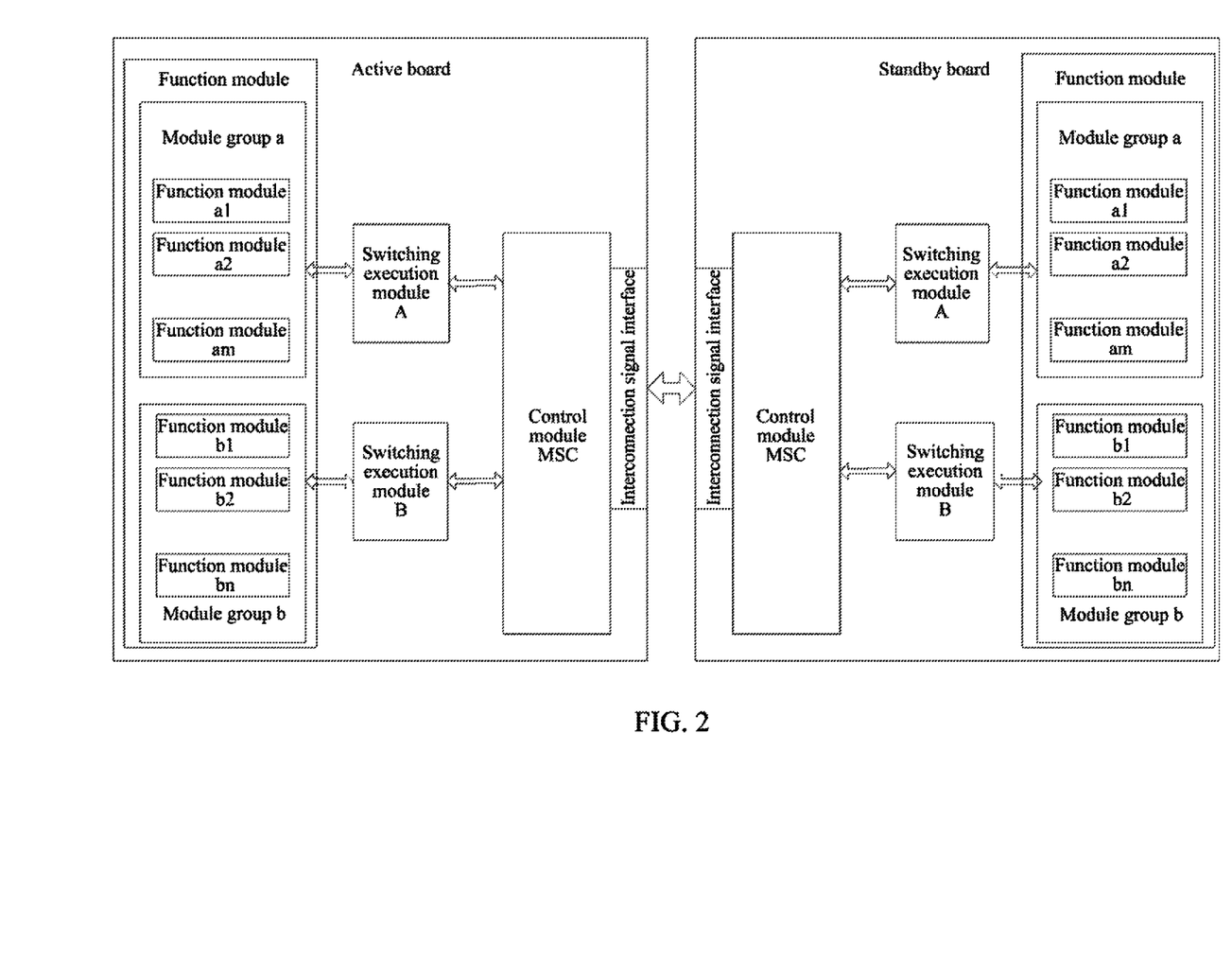
FIG. 2 is a structure diagram of the system according to the first example provided in the present invention.

In order to solve the problem of being unable to implement the active and standby switching in the system comprising a plurality of function units which are required to avoid being in the active state at the same time and a plurality of function units which are required to avoid being in the standby state at the same time, the first example provided in the present invention is a method for switching the active and standby boards, and the composition units of the system for switching the active and standby using this method is shown in FIG. 2. As a whole system, two boards of the active board and the standby board are comprised, and they have the completely same internal structure, and the following will take one board thereinto as an example to describe the composition modules.

A control module MSC is composed of a hardware unit, and its function is to respond to the switching triggering signal and complete the pre-switching processing, and said pre-switching processing is for pre judging whether the switching condition is satisfied, and providing a control signal after the initial processing to the execution module of the latter stage;

a switching execution module, which is composed of the software unit and the hardware unit together, comprises 2 sub-modules, namely a switching execution module A which controls the switching of the function modules being unable to be in the active state at the same time and a switching execution module B which controls the switching of the function modules being unable to be in the standby state at the same time.

Function modules comprise a plurality of different function modules a1, a2, . . . , am, b1, b2, . . . , bn, and in FIG. 2, the function modules a1, a2, . . . , am which are unable to be in the active state at the same time are classified as one type of module group a; the function modules b1, b2, . . . , bn which are unable to be in the standby state at the same time are classified as one type of module group b; and in the practical application, the simplest example can only have a1 and b1.

The interconnection signal interfaces between the active and standby boards are generally divided into two groups of input interconnection signal interfaces and output interconnection signal interfaces, which provide connections for the control modules MSC of the active board and the standby board.

In the system for switching the active and standby using the method of this example, the module group a and module group b on the active board are in the active state and the module group a and module group b on the standby board are in the standby state before carrying out the active and standby switching, and the module group a and module group b on the active board are in the standby state and the module group a and module group b on the standby board are in the active state after switching, and the particular switching process comprises following steps:

1. the control module of the active board completes the pre-switching processing;

2. the module group a of the active board is switched into the standby state;

3. the standby board is notified that the module group a of the active board has completed the switching;

4. the control module of the standby board completes the pre-switching processing;

5. the module group a of the standby board is switched into the active state;

6. the module group b of the standby board is switched into the active state;

7. the active board is notified that the module group b of the standby board has completed the switching;

8. the module group b of the active board is switched into the standby state;

9. the switching process is completed.

Figure 3:
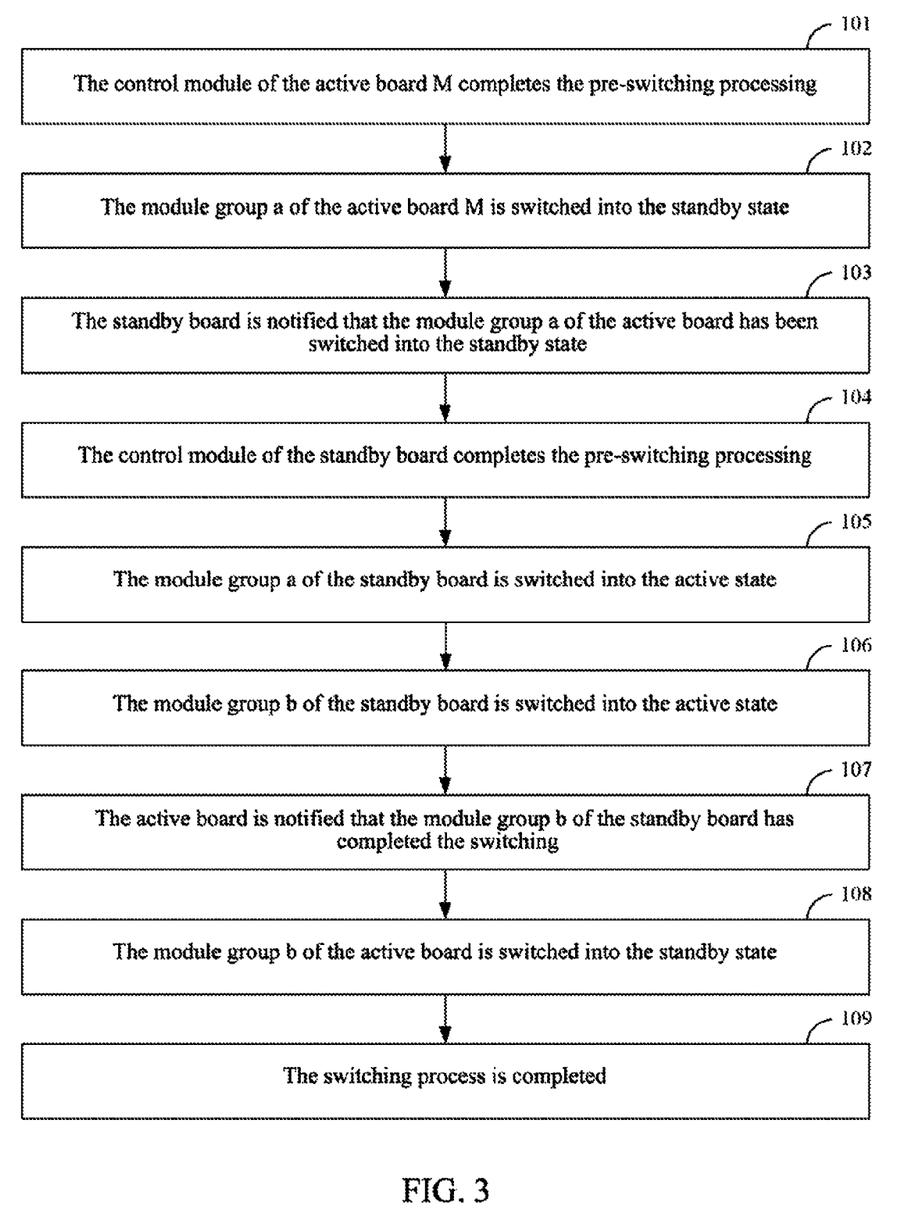
FIG. 3 is a flow chart of the method according to the first example provided in the present invention.

The flow of the method according to this example is as shown in FIG. 3, and comprises:

step 101: the control module of the active board M responds to the input triggering message, and judges whether the system satisfies the switching condition, including whether the board on the other end can work normally and so on, so as to improve the stability of the system. If the switching condition is not satisfied, the switching process is terminated herein; and if the switching condition is satisfied, the pre-switching processing will be completed, and a generated secondary stage control signal is taken as a message to notify the switching execution module A.

Notes: the switching is triggered before step 101: when a certain external or internal triggering condition changes, the switching process is triggered, and the triggering message is transmitted to the control module at first, and it is the control module of the active board M that starts the switching operation at first. Certainly, it also can be the control module of the standby board that starts the switching operation at first.

After the switching pre-processing starts, the switching shielding function can be started so as to ensure not to respond to the new switching request any more before not completing the switching process completely.

Step 102, under the processing of the switching execution module A, the active board M will complete the switching of the function modules which are unable to be in the active state at the same time, and switch a1, a2, . . . , am into the standby state in sequence or at the same time, and generates a next stage control signal to send to the control module after all the function modules of the a1~am complete the state switching.

Step 103, the control module will send the information sent by the switching execution module A to the control module of the standby board S through the interconnection signal interface between the active and standby boards, and the module group a of the active board has been switched into the standby state.

Step 104, the control module of the standby board S will complete the pre-switching processing, and generates the secondary stage control signal to notify the switching execution module A of the standby board.

Step 105, under the control of the switching execution module A of the standby board S, a1, a2, ..., am function modules of the standby board S are switched into the active state in sequence, and a next stage control signal is generated to be sent to the control module after all of these function modules complete the state switching.

Notes: these units of the two boards are in the standby state at the same time in the duration from the time after the a1, a2, ..., am of the active board M are switched into the standby state to the time of the a1, a2, ..., am of the standby board S being switched into the active state.

Step 106, the control module will send a message to notify the switching execution module B after receiving that the a1, a2, ..., am have been switched into the standby state. The switching execution module B will be responsible for switching the b1, b2, ..., bn function modules of the standby board into the active state in sequence or at the same time. And a next stage control signal is generated to notify the control module after all of these function modules are switched into the active state.

Step 107, the control module of the standby board S will notify the control module of the board on the other end (the active board M) through the interconnection signal interface between the boards after receiving the message that the b1, b2, ..., bn have been switched into the active state. So far, all the function modules of the standby board S have initially completed the state switching, and are stabilized in the active state.

Step 108, the control module of the active board M will notify the switching execution module B to execute the switching. The switching execution module B is responsible for switching b1, b2, ..., bn function modules into the standby state in sequence, and generating a next stage control signal to return to the pre-switching control module after all of these function modules completes the state switching.

Notes: these units of the two boards are in the active state at the same time in the duration from the time after the b1, b2, ..., bn of the standby board S are switched into the active state to the time of the b1, b2, ..., bn of the active board M being switched into the standby state.

Step 109, the control module of the active board M judges that the switching process is completed according to the returned signal, and stabilizes all the states, and if the switching shielding mechanism is started, then it should recover to the normal state.

The abnormal case occurring in the switching process can be processed as the following way: when the switching is executed in the mid process, it is detected that the current state is unable to continue the switching, and the state before the switching is recovered in a way of performing in a strict inverse order.

For a more complex system, if a plurality of function modules c1, c2, ..., cx are further comprised, they do not have the requirement for the active and standby states, for example, the function modules c1, c2, ..., cx can be in the active state or the standby state at the same time in the active board and the standby board, or be in the active state in the active board and be in the standby state in the standby board, and also can be in the standby state in the active board and be in the active state in the standby board. Then there are two ways to carry out the processing: one is the processing according to the way of the switching execution module A, the other is the processing according to the way of the switching execution module B.

If it is the processing according to the way of the switching execution module A, namely processing according to the way of avoiding both being in the active state, then the active and standby states of the c1, c2, ..., cx can be switched just after completing the switching of the a1, a2, ..., am in steps 102 and 105.

If it is the processing according to the way of the switching execution module B, namely processing according to the way of avoiding both being in the standby state, then the active and standby states of the c1, c2, ..., cx can be switched just after completing the switching of the b1, b2, ..., bn in steps 106 and 108.

The suitable range of this scheme includes the simplest system comprising two modules, and even the complex system comprising a plurality of modules, and all of these can be ensured to securely implement the active and standby switching. As long as these modules are divided into the module group of avoiding both being in the active state and the module group of avoiding both being in the standby state according to the different function requirements, the switching can be implemented securely stage by stage according to the method described in this scheme.

Figure 4:
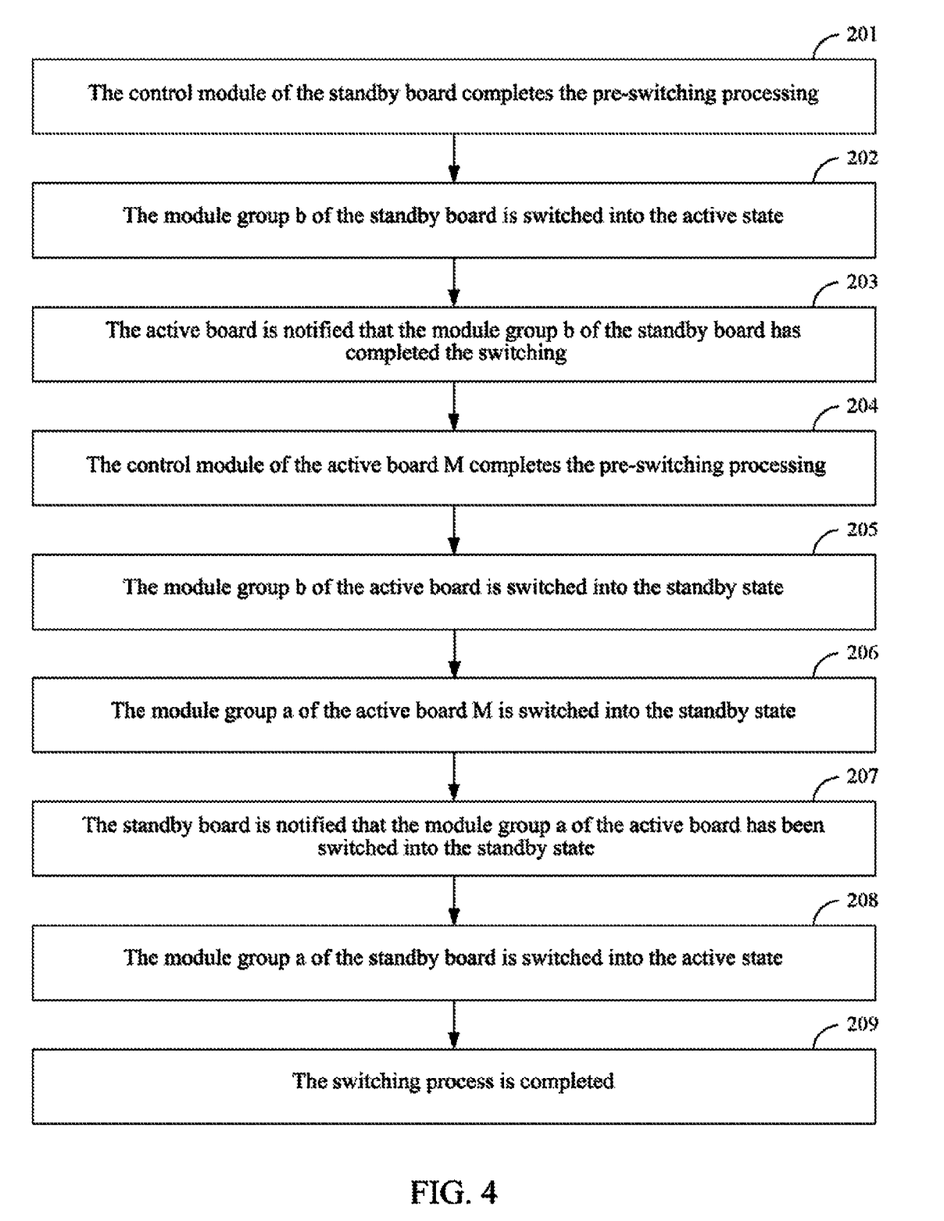
FIG. 4 is a flow chart of the method according to the second example provided in the present invention.

Certainly, it also can be the control module of the standby board that starts the switching operation at first, so the present invention provides the second example, and the flow of the method is shown in FIG. 4, and comprises:

step 201, the control module of the standby board S responds to the input triggering message, and judges whether the system satisfies the switching condition, including whether the board on the other end can work normally and so on, so as to improve the stability of the system. If the switching condition is not satisfied, the switching process is terminated herein; and if the switching condition is satisfied, then the switching pre-processing namely the pre-switching will be completed, and a generated secondary stage control signal is taken as a message to notify the switching execution module B.

Step 202, the switching execution module B will be responsible for switching the b1, b2, ..., bn function modules of the standby board into the active state in sequence or at the same time. And a next stage control signal is generated to notify the control module after all of these function modules are switched into the active state.

Step 203, the control module of the standby board S will notify the control module of the board on the other end (the active board M) through the interconnection signal interface between the boards after receiving the message that b1, b2, ..., bn have been switched into the active state.

Step 204, the control module of the active board M responds to the input triggering message, and judges whether the system satisfies the switching condition, including whether the board on the other end can work normally and so on, so as to improve the stability of the system. If the switching condition is not satisfied, the switching process is terminated herein; and if the switching condition is satisfied, then the switching pre-processing namely the pre-switching will be completed, and a generated secondary stage control signal is taken as a message to notify the switching execution module B.

Step 205, the switching execution module B of the active board M is responsible for switching the b1, b2, ..., bn function modules into the standby state in sequence, and a next stage control signal is generated to be returned to the pre-switching control module after all of these function modules complete the state switching. The control module will send a message to notify the switching execution module A after receiving that the b1, b2, . . . , bn have been switched into the standby state.

Step 206, under the processing of the switching execution module A, the active board M will complete the switching of the function modules which are unable to be in the active state at the same time, and a1, a2, . . . , am are switched into the standby state in sequence or at the same time, and a next stage control signal is generated to be sent to the control module after all of the function modules a1~am complete the state switching. So far, all of the function modules of the active board M have initially completed the state switching, and are stabilized in the standby state.

Step 207, the control module will send the information sent by the switching execution module A to the control module of the standby board S through the interconnection signal interface between the active and standby boards, and the module group a of the active board has been switched into the standby state.

Step 208, under the control of the switching execution module A of the standby board S, the a1, a2 . . . am function modules are switched into the active state in sequence, and a next stage control signal is generated to be sent to the control module after all of these function modules complete the state switching.

Step 209, the control module of the standby board S judges that the switching process is completed according to the returned signal, and stabilizes all the states, and if the switching shielding mechanism is started, then it should recover to the normal state.

Figure 5:
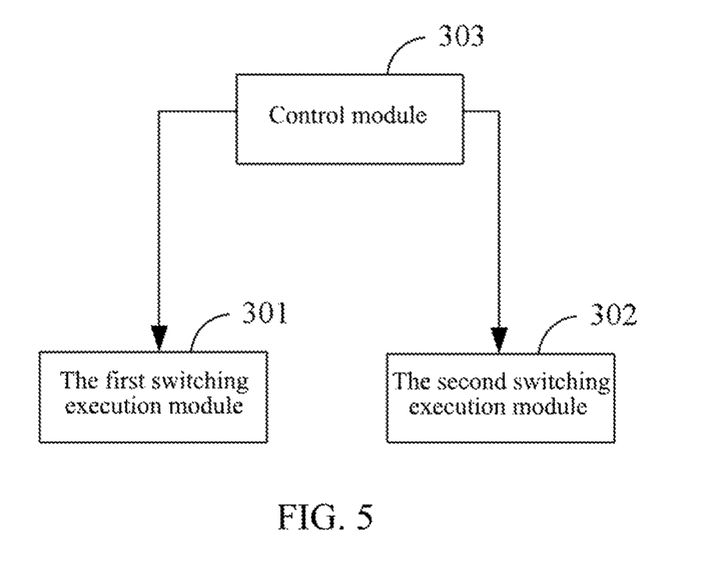
FIG. 5 is a structure diagram of the apparatus according to the third example provided in the present invention.

The third example provided in the present invention is an apparatus for switching an active board and a standby board, and as shown in FIG. 5, this apparatus comprises:

the first switching execution module 301, which is used for switching the first type function module on the first working state board into the second working state, said first type function module being unable to be in the first working state on the first working state board and the second working state board at the same time, and switching the first type function module on the second working state board into the first working state;

the second switching execution module 302, which is used for switching the second type function module on the second working state board into the first working state, said second type function module being unable to be in the second working state on the first working state board and the second working state board at the same time, and switching the second type function module on the first working state board into the second working state.

Furthermore, the first switching execution module 301 is used for switching the first type function module on the first working state board into the second working state, said first type function module being unable to be in the first working state on the first working state board and the second working state board at the same time, and switching the first type function module on the second working state board into the first working state, and said first working state is the active state and the second working state is the standby state, or said second working state is the active state and the first working state is the standby state;

the second switching execution module 302 is used for switching the second type function module on the second working state board into the first working state, said second type function module being unable to be in the second working state on the first working state board and the second working state board at the same time, and switching the second type function module on the first working state board into the second working state.

Furthermore, said apparatus further comprises:

a control module 303, which is used for determining that the first working state board is able to be switched and sending the first switching notification, and determining that the second working state board is able to be switched and sending the second switching notification.

Furthermore, the first switching execution module 301 is further used for switching the first type function module on the first working state board into the second working state according to the first switching notification, and switching the first type function module on the second working state board into the first working state according to the first switching notification;

the second switching execution module 302 is further used for switching the second type function module on the second working state board into the first working state according to the second switching notification, and switching the second type function module on the first working state board into the second working state according to the second switching notification.

Furthermore, the control module 303 is used for carrying out the switching shielding to forbid responding to the new switching request after determining that the first working state board is able to be switched; and is further used for relieving the switching shielding after completing all the switchings.

Furthermore, the first switching execution module 301 is further used for switching the third type function module on the first working state board into the second working state, switching the third type function module on the second working state board into the first working state, and said third type function module is in the first working state or the second working state on the first working state board and the second working state board at the same time, or said third type function module is in the first working state on the first working state board, and is in the second working state on the second working state board, or said third type function module is in the second working state on the first working state board, and is in the first working state on the second working state board;

the second switching execution module 302 is further used for switching the third type function module on the second working state board into the first working state, and switching the third type function module on the first working state board into the second working state.

Obviously, an ordinary person skilled in the art can make various modifications and transformations on the present invention without departing from the spirit or scope of the present invention. Thus, if these modifications and transformations of the present invention fall into the scope of the claims of the present invention and its equivalent technique, then the present invention also intends to comprise these modifications and transformations.

INDUSTRIAL APPLICABILITY

The method and apparatus for switching an active board and a standby board provided in the present invention switch function modules according to different types in sequence, so as to implement the active and standby switching in the system comprising a plurality of function units which are required to avoid being in the active state at the same time and a plurality of function units which are required to avoid being in the standby state at the same time.

What is claimed is:

1. A method for switching an active board and a standby board, said active board being one of a first working state board and a second working state board, said standby board being the other of the first working state board and the second working state board; and said method comprising:
switching a first type function module on said first working state board into a second working state, wherein said first type function module is unable to be in a first working state on said first working state board and said second working state board at the same time; switching a first type function module on said second working state board into said first working state;
switching a second type function module on said second working state board into said first working state, wherein said second type function module is unable to be in said second working state on said first working state board and said second working state board at the same time; switching the second type function module on said first working state board into said second working state;
wherein before the step of switching the first type function module on said first working state board into the second working state, further comprises: determining that said first working state board is able to be switched and sending a first switching notification.

2. The method as claimed in claim 1, wherein
the step of switching the first type function module on said first working state board into said second working state comprises: switching said first type function module on said first working state board into said second working state according to said first switching notification;
the step of switching said first type function module on said second working state board into the first working state comprises: switching said first type function module on said second working state board into said first working state according to said first switching notification.

3. The method as claimed in claim 1, wherein before the step of switching the second type function module on said second working state board into said first working state, further comprises:
determining that said second working state board is able to be switched and sending a second switching notification.

4. The method as claimed in claim 3, wherein
the step of switching the second type function module on said second working state board into said first working state comprises: switching said second type function module on said second working state board into said first working state according to said second switching notification;
the step of switching the second type function module on said first working state board into said second working state comprises: switching said second type function module on said first working state board into said second working state according to said second switching notification.

5. The method as claimed in claim 1, which further comprises: carrying out switching shielding to forbid responding to a new switching request after determining that said first working state board is able to be switched.

6. The method as claimed in claim 1, wherein
after the step of switching the first type function module on said first working state board into the second working state, and switching the first type function module on said second working state board into said first working state, further comprises:
switching a third type function module on said first working state board into said second working state, and switching the third type function module on said second working state board into said first working state, wherein said third type function module is in said first working state or said second working state on said first working state board and said second working state board at the same time, or said third type function module is in said first working state on said first working state board and is in said second working state on said second working state board, or said third type function module is in said second working state on said first working state board and is in said first working state on said second working state board;
after the step of switching the second type function module on said second working state board into the first working state, and switching the second type function module on said first working state board into said second working state, further comprises:
switching said third type function module on said second working state board into said first working state, and switching said third type function module on said first working state board into said second working state.

7. The method as claimed in claim 6, which further comprises: relieving said switching shielding after completing all switchings.

8. An apparatus for switching an active board and a standby board, said active board being one of a first working state board and a second working state board, said standby board being the other of the first working state board and the second working state board; and said apparatus comprising:
a first switching execution module, which is configured to switch a first type function module on said first working state board into a second working state, wherein said first type function module is unable to be in a first working state on said first working state board and said second working state board at the same time, and switch a first type function module on said second working state board into said first working state; and
a second switching execution module, which is configured to switch a second type function module on said second working state board into said first working state, wherein said second type function module is unable to be in said second working state on said first working state board and said second working state board at the same time, and switch the second type function module on said first working state board into said second working state;
a control module, which is configured to determine that said first working state board is able to be switched and send a first switching notification, and determine that said second working state board is able to be switched and send a second switching notification.

9. The apparatus as claimed in claim 8, wherein
said first switching execution module is further configured to switch said first type function module on said first working state board into said second working state according to said first switching notification, and switch said first type function module on said second working state board into said first working state according to said first switching notification;
said second switching execution module is further configured to switch said second type function module on said second working state board into said first working state according to said second switching notification, and switch said second type function module on said first working state board into said second working state according to said second switching notification.

10. The apparatus as claimed in claim 8, wherein said control module is further configured to carry out switching shielding to forbid responding to a new switching request after determining that said first working state board is able to be switched; and is further configured to relieve said switching shielding after completing all switchings.

11. The apparatus as claimed in claim 8, wherein
said first switching execution module is further configured to switch a third type function module on said first working state board into said second working state, and switch the third type function module on said second working state board into said first working state, wherein said third type function module is in said first working state or said second working state on said first working state board and said second working state board at the same time, or said third type function module is in said first working state on said first working state board and is in said second working state on said second working state board, or said third type function module is in said second working state on said first working state board and is in said first working state on said second working state board;
said second switching execution module is further configured to switch said third type function module on said second working state board into said first working state, and switch said third type function module on said first working state board into said second working state.

* * * * *